:::{.column}
(12) United States Patent
Roodenburg et al.

(10) Patent No.: US 10,941,023 B2
(45) Date of Patent: Mar. 9, 2021

(54) WAVE-INDUCED MOTION COMPENSATING CRANE FOR USE ON AN OFFSHORE VESSEL, VESSEL AND LOAD TRANSFERRING METHOD

(71) Applicant: ITREC B.V., Scheidam (NL)

(72) Inventors: David Roodenburg, Scheidam (NL); Cornelis Martinus Van Veluw, Scheidam (NL); Bart Otto Fredrik Wieck, Scheidam (NL); Wouter Jacob Willem Den Boer, Scheidam (NL)

(73) Assignee: ITREC B.V., Schiedam (NL)

(*) Notice: Subject to any disclaimer, the term of this patent is extended or adjusted under 35 U.S.C. 154(b) by 98 days.

(21) Appl. No.: 16/466,966

(22) PCT Filed: Dec. 5, 2017

(86) PCT No.: PCT/NL2017/050812
§ 371 (c)(1),
(2) Date: Jun. 5, 2019

(87) PCT Pub. No.: WO2018/106105
PCT Pub. Date: Jun. 14, 2018

(65) Prior Publication Data
US 2019/0337772 A1  Nov. 7, 2019

(30) Foreign Application Priority Data

Dec. 6, 2016  (NL) ...................................... 2017937

(51) Int. Cl.
*B66C 13/04* (2006.01)
*F03D 13/10* (2016.01)
(Continued)

(52) U.S. Cl.
CPC .............. *B66C 13/04* (2013.01); *B63B 27/10* (2013.01); *B66C 23/52* (2013.01); *B66D 1/50* (2013.01); *F03D 13/10* (2016.05); *B66C 23/185* (2013.01)

(58) Field of Classification Search
CPC ....... B66C 13/02; B66C 13/04; B66C 23/185; B66C 23/52; F03D 13/10; B63B 27/10; B66D 1/50; B66D 1/52; Y02E 10/72
See application file for complete search history.

(56) References Cited

U.S. PATENT DOCUMENTS 5,253,606 A * 10/1993 Ortelli ..................... B66C 13/02
114/259
6,523,491 B1 * 2/2003 Moise, II ................ B63B 35/00
114/265
(Continued)

FOREIGN PATENT DOCUMENTS

KR  10-2011-0125555 A  11/2011
WO  2011/034422 A2  3/2011
(Continued)

OTHER PUBLICATIONS

International Search Report issued in PCT/NL2017/050812 (PCT/ISA/210), dated Mar. 6, 2018.
(Continued)

*Primary Examiner* — Michael R Mansen
*Assistant Examiner* — Juan J Compos, Jr.
(74) *Attorney, Agent, or Firm* — Birch, Stewart, Kolasch & Birch, LLP

(57) ABSTRACT

A wave-induced motion compensation crane and corresponding vessel and method are disclosed. The crane includes a motion compensation device at a tip end portion of the boom structure to compensate for X-Y wave-induced motion and a heave compensation device for Z-motion. The motion compensation device includes a moveable jib beam
(Continued)

:::

that extends in a substantially horizontal direction. The jib beam is slewable about a substantially vertical slew axis and translatable in a longitudinal direction of the jib beam. Preferably, the jib beam can be levelled based on the angular orientation of the boom structure.

20 Claims, 6 Drawing Sheets

(51) Int. Cl.
    *B63B 27/10*     (2006.01)
    *B66C 23/52*     (2006.01)
    *B66D 1/50*     (2006.01)
    *B66C 23/18*     (2006.01)

(56) References Cited

U.S. PATENT DOCUMENTS

| | | | |
|---|---|---|---|
| 2010/0089855 A1* | 4/2010 | Kjolseth | B66C 13/02 |
| | | | 212/276 |
| 2014/0166604 A1 | 6/2014 | Hey | |
| 2020/0062554 A1* | 2/2020 | Boroy | B66C 13/02 |

FOREIGN PATENT DOCUMENTS

| | | | | |
|---|---|---|---|---|
| WO | 2015/199543 A1 | 12/2015 | | |
| WO | WO-2017103139 A1 * | 6/2017 | | B66C 13/02 |

OTHER PUBLICATIONS

Written Opinion of the International Searching Authority issued in PCT/NL2017/050812 (PCT/ISA/237), dated Mar. 6, 2018.

* cited by examiner

WAVE-INDUCED MOTION COMPENSATING CRANE FOR USE ON AN OFFSHORE VESSEL, VESSEL AND LOAD TRANSFERRING METHOD

FIELD OF THE INVENTION

The invention relates to a wave-induced motion compensating crane for use on an offshore vessel, e.g. for installation or removal of one or more components of an offshore wind turbine. The invention further relates to a vessel comprising such a crane, and to a method to transfer loads using such a crane.

BACKGROUND OF THE INVENTION

When transferring loads from and to a vessel, wave-induced motion of the vessel is a well-known problem to be dealt with during this process. A well-known solution to this problem is to make use of a jack-up type of vessel in which legs are lowered into the water to lift the vessel at least partially out of the water so that waves have a limited or minimal effect on the vessel. However, a drawback of such a jack-up type vessel is that it takes a lot of time to lower the legs and to lift the vessel out of the water and to go through the reverse process after transferring the load.

Another prior art solution is to compensate the wave-induced motion of the vessel by operating the crane accordingly. That is, the crane is operated such that the elements thereof that are normally used to position an object suspension device/load, e.g. the winch(es) thereof, are then, e.g. simultaneously, used for wave-induced motion compensation. Alternatively, the crane may be positioned on a wave-induced motion compensated platform, wherein the position and orientation of the platform is adjusted to compensate for the wave-induced motion of the vessel. An advantage thereof is that any type of crane can be positioned on the platform, but a major disadvantage is that the platform carries the entire weight of the crane including load.

A further prior art solution is to compensate the wave-induced motion of the vessel at a tip end portion of the crane, for instance using a device as disclosed in WO2015/199543. However, with increasing load and increasing lifting height, e.g. as encountered when lifting wind turbine parts such as wind turbine blades, gear boxes, generators and nacelles, such devices are not capable of handling the relatively large loads at relatively high lifting heights.

OBJECT OF THE INVENTION

Hence, it is an object of the invention to provide a wave-induced motion compensating crane that is suitable for lifting relatively large loads to relatively large heights.

SUMMARY OF THE INVENTION

According to a first aspect of the invention, this object is achieved by providing a wave-induced motion compensating crane for use on an offshore vessel. The crane comprises:
 a base structure adapted to be mounted on the vessel;
 a revolving superstructure adapted to revolve about a substantially vertical revolving axis relative to the base structure;
 a boom structure mounted to the superstructure and pivotally connected at a first end thereof to pivot about a substantially horizontal boom pivot axis relative to the superstructure;
 a motion compensation device mounted to a tip end portion of the boom structure;
 a hoist winch, a hoist cable and an object suspension device suspended from said hoist cable, wherein the hoist winch is mounted on the revolving superstructure or on the boom structure, and wherein the hoist cable extends from the hoist winch to the tip end portion of the boom structure and then along the motion compensation device to the object suspension device;
 a heave compensation device that acts on the hoist cable, wherein the heave compensation device is integrated in the hoist winch and/or arranged to act on the hoist cable intermediate the hoist winch and the tip end portion of the boom structure; and
 a control unit.

The motion compensation device comprises:
 a pedestal member that is pivotally connected to the tip end portion of the boom structure to pivot about a substantially horizontal pedestal member pivot axis which is parallel to the substantially horizontal boom pivot axis;
 a level setting device that is arranged between the boom structure and the pedestal member and that is adapted to set the pedestal member in a levelled position;
 a slewing jib beam support member that is secured to the pedestal member to revolve about a vertical slew axis relative to said pedestal member in said levelled position thereof;
 a slew drive connected to said control unit and adapted to cause controlled slew motion of said jib beam support member about said vertical slew axis;
 a linear displaceable jib beam that is supported by said jib beam support member via one or more jib beam guides that define a linear motion path of the jib beam relative to the jib beam support member, said linear motion path extending substantially horizontal when said pedestal member is in said levelled position; and
 a jib beam drive connected to said control unit and adapted to cause controlled linear motion of said jib beam relative to the jib beam support member.

Herein the jib beam carries a sheave arrangement with a front sheave at a front portion of the jib beam from which the hoist cable extends to a sheave of the object suspension device, with a rear sheave remote from said front sheave, and with a first guide sheave. This first guide sheave is arranged such that the hoist cable extends from a sheave of the object suspension device via the first guide sheave to the jib beam support member and is connected thereto with a terminal end.

Furthermore the jib beam support member carries a second guide sheave from which said hoist cable extends to the rear sheave on the jib beam. The first and second guide sheaves are arranged so that the length of hoist cable between the second guide sheave on the jib beam support member and the terminal end is substantially constant independent of the linear position of the jib beam relative to the jib beam support member.

The control unit provides a wave-induced motion compensation mode wherein the slew drive of the jib beam support member and the jib beam drive of the compensation device are operated to maintain a predetermined X-Y location of the object suspension device.

The heave compensation device is operable to compensate wave-induced Z-motion of the object suspension device.

As the motion compensation device is mounted to the tip end portion of the boom structure, the motion compensation established thereby is carried out close to the location where the hoist cable extends between the crane and the object suspension device. The angular orientation of the revolving superstructure about the vertical revolving axis and the angular orientation of the boom structure about the boom pivot axis can be fixed during motion compensation. This means that only a small part of the crane is moved for compensation purposes compared to prior art solutions in which the entire crane or a large part of the crane is moved. As a result, the required driving capacity for the compensation can be smaller.

The fact that the hoist winch is mounted on the superstructure or on the boom structure and not on the motion compensation device further reduces the weight of the moving part of the crane. Especially when the loads to be transferred increase, the hoist winch will increase in weight accordingly, so that in case the hoist winch is arranged on the motion compensation device, the weight of the hoist winch would require an unnecessary increase in driving capacity for the motion compensation.

Using a heave compensation device to compensate wave-induced Z-motion of the object suspension device reduces the required complexity of the motion compensation device as it is no longer required to move the tip end portion of the boom or (a part of) the motion compensation device up and down to compensate wave-induced Z-motion.

An advantage of the crane according to the first aspect of the invention is that the jib beam can be moved along a substantially horizontal linear motion path due to setting the pedestal member in the levelled position and that the length of the hoist cable between the second guide sheave on the jib beam support member and the terminal end is substantially constant independent of the linear position of the jib beam relative to the jib beam support member. The horizontal wave-induced motion compensation is then uncoupled from the vertical wave-induced motion compensation as movement of the jib beam in a horizontal plane does not substantially result in vertical movement of the object suspension device.

Another advantage of the jib beam extending substantially horizontally may be that the object suspension device is suspended from the jib beam at a relatively large distance from the boom structure. The object suspension device can thus be positioned above an offshore vessel or structure, e.g. a wind turbine or part thereof, by positioning the motion compensation device over the offshore vessel or structure while the boom structure stays clear from the offshore vessel or structure and there is less chance of collision between the crane and the offshore vessel or structure or between the crane carrying vessel and the offshore vessel or structure.

A further advantage may be that wave-induced motion of the vessel can be allowed during e.g. installation and maintenance of wind turbines. As a result, the vessel can be designed smaller having the advantage that it is easier to manoeuvre and thus quicker to position close to another vessel or structure. The result can additionally or alternatively be that the vessel can still be operated during less favourable weather and/or wave conditions.

Yet another advantage of the crane according to the first aspect of the invention is that the motion compensation device is capable of carrying a relatively large load.

In an embodiment, the level setting device is connected to the control unit, wherein the control unit is configured to operate the level setting device at least prior to operating in the wave-induced motion compensation mode to set the pedestal member level in correspondence with the angle of the boom structure portion that carries the motion compensation device. The main advantage thereof is that the linear motion path of the jib beam is substantially horizontal and consequently the slew axis of the jib beam support member is substantially vertical thereby resulting in a substantially optimal uncoupling of the horizontal and vertical motion compensation.

In an embodiment, the control unit is further configured to keep the pedestal member stationary relative to the boom portion during the wave-induced motion compensation mode. This may reduce the dynamic load requirements for the level setting device thereby increasing the weight of the load that can be carried. Alternatively, e.g. especially for relatively small loads, the level setting device may be used to dynamically keep the pedestal member levelled during motion compensation which improves the uncoupling between horizontal and vertical motion compensation but may reduce the weight that can be handled by the crane and motion compensation device.

In an embodiment, the pedestal member pivot axis defines the sole degree of freedom of the pedestal member relative to the tip end portion of the boom structure. This may result in a robust connection between tip end portion of the boom structure and the pedestal member.

In an embodiment, the heave compensation device is an active heave compensation device connected to the control unit, e.g. integrated with a motor drive of a drum of the hoist winch. The heave compensation device may also be a passive heave compensation, but the active heave compensation device may provide better control possibilities.

In an embodiment, the jib support beam member is a cantilever, wherein a rear portion thereof is connected with a slew bearing to the pedestal member, and wherein the cantilever extends in forward direction thereof. This allows to effectively support the jib beam in all positions along the linear motion path.

In an embodiment, the slew drive comprises one or more slew drive motors driving one or more pinions that mesh with a slew gear ring.

In an embodiment, the jib beam drive comprises one or more linear hydraulic cylinders extending parallel to the jib beam.

In an embodiment, the boom structure is a single rigid and fixed length boom, e.g. a latticed boom.

In an embodiment, the lifting capacity of the crane is at least 40 metric tons, preferably at least 60 metric tons, more preferably at least 80 metric tons, and most preferably at least 100 metric tons, e.g. at least 120 metric tons.

In an embodiment, the boom structure has a length of at least 40 m, preferably at least 60 m, more preferably at least 80 m, and most preferably at least 100 m, e.g. at least 120 m.

The first aspect of the invention also relates to a vessel comprising a crane according to the first aspect of the invention.

In an embodiment, the base structure is fixed to the vessel so that the base structure forms a unit with the vessel that is subjected to wave-induced motion.

In an embodiment, the vessel is a semi-submersible vessel. For instance, semi-submersible vessel with a pontoon configuration may be used, in which one column per pontoon is provided, so to result in a SWATH-type vessel. Alternatively multiple columns per pontoon may be provided as well, e.g. two or three columns per pontoon, to result in a more conventional semi-submersible vessel.

The advantage of employing a SWATH type or semi-submersible vessel over a monohull vessel is that the total cross sectional area of the columns thereof that intersect the water surface is smaller. As a result the wave-induced motions of such a SWATH type or semi-submersible vessel are smaller compared to a monohull vessel. However, wave-induced motions cannot be eliminated entirely in all situations.

In an embodiment, the vessel is a jack-up vessel having jack-up legs, wherein the crane is an around-the-leg crane with the superstructure revolving around a jack-up leg. The invention for example allows for operation of the crane with the vessel in floating condition, so subjected to wave motion during the hoisting operation.

In an embodiment, the vessel is both a semi-submersible vessel and a jack-up type vessel having jack-up legs extending through corresponding columns of the semi-submersible vessel. This has the advantage that when conditions are not favourable to operate the vessel in floating condition, the jack-up legs can be extended to operate the vessel in jack-up mode. This increases the versatility of the vessel.

The first aspect of the invention further relates to a method for transferring a load using a crane according to the first aspect of the invention. This method comprises the following steps:
 a) hoisting the load from a first vessel or structure with the object suspension device;
 b) positioning the load above a second vessel or structure;
 c) landing the load on the second vessel or structure,
wherein during hoisting and/or lowering of the load, at least when the load is in contact with or close to a corresponding vessel or structure, the control unit is operated in wave-induced motion compensation mode and the heave compensation device is operated to compensate wave-induced motion of the object-suspension device.

In an embodiment, the control unit is at least operated in wave-induced motion compensation mode and the heave compensation device is at least operated to compensate wave-induced motion of the object-suspension device when the load is within a predetermined distance from a corresponding vessel or structure, e.g. within 5 m, preferably within 10 m, more preferably within 20 m.

In an embodiment, prior to operating the control unit in the wave-induced motion compensation mode the pedestal member is positioned in the levelled position by the level setting device in correspondence with the angle of the boom structure portion carrying the motion compensation device.

In an embodiment, the first vessel is the vessel carrying the crane.

In an embodiment, the second vessel is the vessel carrying the crane.

The first aspect of the invention also relates to a method for installing a component of a wind turbine, e.g. a wind turbine blade, generator, gear box or nacelle, or for carrying out maintenance to said component, wherein use is made of a vessel according to the first aspect of the invention.

In an embodiment, the vessel is in floating condition during installation or maintenance of the component.

According to a second aspect of the invention, there is provided a wave-induced motion compensating crane for use on an offshore vessel, the crane comprising:
 a base structure adapted to be mounted on the vessel;
 a revolving superstructure adapted to revolve about a substantially vertical revolving axis relative to the base structure;
 a boom structure mounted to the superstructure and pivotally connected at a first end thereof to pivot about a substantially horizontal boom pivot axis relative to the superstructure;
 a motion compensation device mounted to a tip end portion of the boom structure;
 a hoist winch, a hoist cable and an object suspension device suspended from said hoist cable, wherein the hoist winch is mounted on the revolving superstructure or on the boom structure, and wherein the hoist cable extends from the hoist winch to the tip end portion of the boom structure and then along the motion compensation device to the object suspension device;
 a heave compensation device that acts on the hoist cable, wherein the heave compensation device is integrated in the hoist winch and/or arranged to act on the hoist cable intermediate the hoist winch and the tip end portion of the boom structure; and
 a control unit.

The motion compensation device comprises:
 a pedestal member that is pivotally connected to the tip end portion of the boom structure to pivot about a substantially horizontal pedestal member pivot axis which is parallel to the substantially horizontal boom pivot axis;
 a level setting device that is arranged between the boom structure and the pedestal member and that is adapted to set the pedestal member in a levelled position;
 a jib beam support member that is secured to the pedestal member;
 a linear displaceable jib beam that is supported by said jib beam support member via one or more jib beam guides that define a linear motion path of the jib beam relative to the jib beam support member, said linear motion path extending substantially horizontal when said pedestal member is in said levelled position; and
 a jib beam drive connected to said control unit and adapted to cause controlled linear motion of said jib beam relative to the jib beam support member.

Herein the jib beam carries a sheave arrangement with a front sheave at a front portion of the jib beam from which the hoist cable extends to a sheave of the object suspension device, with a rear sheave remote from said front sheave, and with a first guide sheave arranged such that said hoist cable extends from a sheave of the object suspension device via the first guide sheave to the jib beam support member and is connected thereto with a terminal end.

Furthermore the jib beam support member carries a second guide sheave from which said hoist cable extends to the rear sheave on the jib beam.

The first and second guide sheaves are arranged so that the length of hoist cable between the second guide sheave on the jib beam support member and the terminal end is substantially constant independent of the linear position of the jib beam relative to the jib beam support member.

The control unit provides a wave-induced motion compensation mode wherein the jib beam drive of the compensation device is operated to maintain a predetermined location of the object suspension device in a direction parallel to the linear motion path.

The heave compensation device is operable to compensate wave-induced Z-motion of the object suspension device.

The second aspect of the invention also relates to a vessel comprising such a crane and a method of transferring a load using such a crane or vessel. The second aspect of the invention further relates to a method for installing a component of a wind turbine, e.g. a wind turbine blade, generator, gear box or nacelle, or for carrying out maintenance to said component, wherein use is made of a vessel according to the second aspect of the invention, wherein the vessel is preferably in floating condition.

According to a third aspect of the invention, there is provided a crane comprising:
- a base structure adapted to be mounted to a vessel or structure;
- a superstructure arranged to revolve about a substantially vertical revolving axis relative to the base structure;
- a boom structure pivotally mounted to the superstructure at a first end thereof to pivot about a substantially horizontal boom pivot axis relative to the superstructure;
- a motion compensation device mounted to a tip end portion of the boom structure opposite the first end;
- a hoist winch, a hoist cable and an object suspension device suspended from said hoist cable, wherein the hoist cable extends at least along the motion compensation device to the object suspension device;
- a heave compensation device that acts on the hoist cable; and
- a control unit.

Therein the motion compensation device comprises:
- a pedestal member mounted to the tip end portion of the boom structure;
- a jib beam mounted to the pedestal member, wherein the jib beam is slewable relative to the pedestal member about a substantially vertical slew axis, wherein the jib extends in a substantially horizontal direction away from the substantially vertical slew axis, wherein the hoist cable extends between a hoisting location on the jib beam and the object suspension device at a distance from the substantially vertical slew axis, and wherein said distance is adjustable.

Herein the control unit provides a wave-induced motion compensation mode wherein the jib beam is slewed and said distance is adjusted to maintain a predetermined X-Y location of the object suspension device.

The heave compensation device is operable to compensate wave-induced Z-motion of the object suspension device.

In an embodiment, the distance is adjustable by moving the entire jib beam as for instance described in relation to the first aspect of the invention. However, said distance may also be adjustable by providing a moveable sheave or sheave block or by providing a telescopic jib beam.

The third aspect of the invention also relates to a vessel comprising such a crane and a method of transferring a load using such a crane or vessel. The third aspect of the invention further relates to a method for installing a component of a wind turbine, e.g. a wind turbine blade, generator, gear box or nacelle, or for carrying out maintenance to said component, wherein use is made of a vessel according to the third aspect of the invention, wherein the vessel is preferably in floating condition.

A fourth aspect of the invention relates to a wave and/or wind induced motion compensating crane for use on an offshore vessel, the crane comprising:
- a base structure adapted to be mounted on the vessel;
- superstructure, e.g. a revolving superstructure adapted to revolve about a substantially vertical revolving axis relative to the base structure;
- a boom structure mounted to the superstructure and pivotally connected at a first end thereof to pivot about a substantially horizontal boom pivot axis relative to the superstructure;
- a motion compensation device mounted to a portion, e.g. a tip end portion, of the boom structure;
- a hoist winch, a hoist cable and an object suspension device suspended from said hoist cable, wherein the hoist winch is mounted on the revolving superstructure or on the boom structure, and wherein the hoist cable extends from the hoist winch to the tip end portion of the boom structure and then along the motion compensation device to the object suspension device;
- optionally, a heave compensation device that acts on the hoist cable, wherein the heave compensation device is integrated in the hoist winch and/or arranged to act on the hoist cable intermediate the hoist winch and the tip end portion of the boom structure; and
- a control unit, wherein the motion compensation device comprises:
- a pedestal member that is movably, e.g. pivotally, connected to the portion of the boom structure, e.g. to pivot about a substantially horizontal pedestal member pivot axis which is parallel to the substantially horizontal boom pivot axis;
- a level setting device that is arranged between the boom structure and the pedestal member and that is adapted to set the pedestal member in a levelled position;
- a slewing jib beam support member that is secured to the pedestal member to revolve about a vertical slew axis relative to said pedestal member in said levelled position thereof;
- a slew drive connected to said control unit and adapted to cause controlled slew motion of said jib beam support member about said vertical slew axis;
- a linear displaceable jib beam that is supported by said jib beam support member via one or more jib beam guides that define a linear motion path of the jib beam relative to the jib beam support member, said linear motion path extending substantially horizontal when said pedestal member is in said levelled position;
- a jib beam drive connected to said control unit and adapted to cause controlled linear motion of said jib beam relative to the jib beam support member;

wherein the jib beam carries a sheave arrangement with a front sheave from which the hoist cable extends to a sheave of the object suspension device, with a rear sheave remote from said front sheave, and with a first guide sheave arranged such that said hoist cable extends from a sheave of the object suspension device via the first guide sheave to the jib beam support member and is connected thereto with a terminal end, wherein the jib beam support member carries a second guide sheave from which said hoist cable extends to the rear sheave on the jib beam, wherein, preferably, the first and second guide sheaves are arranged so that the length of hoist cable between the second guide sheave on the jib beam support member and the terminal end is substantially constant independent of the linear position of the jib beam relative to the jib beam support member, wherein the control unit provides a wave-induced motion compensation mode wherein the slew drive of the jib beam support member and the jib beam drive of the compensation device are operated to maintain a predetermined X-Y location of the object suspension device, and wherein the, optionally provided, heave compensation device is operable, when present, to compensate wave-induced Z-motion of the object suspension device.

It will be apparent that features and embodiments of the first aspect of the invention may be readily combined with any of the second, third, and fourth aspect of the invention where appropriate and vice versa. Further, the features and embodiments described in relation to the distance being adjustable in the third aspect of the invention may be used in the first and second aspect of the invention instead of moving the entire jib beam.

The invention will now be described in a non-limiting way by reference to the accompanying drawings, in which like parts are referred to by like reference symbols

DETAILED DESCRIPTION OF EMBODIMENTS

Figure 1:
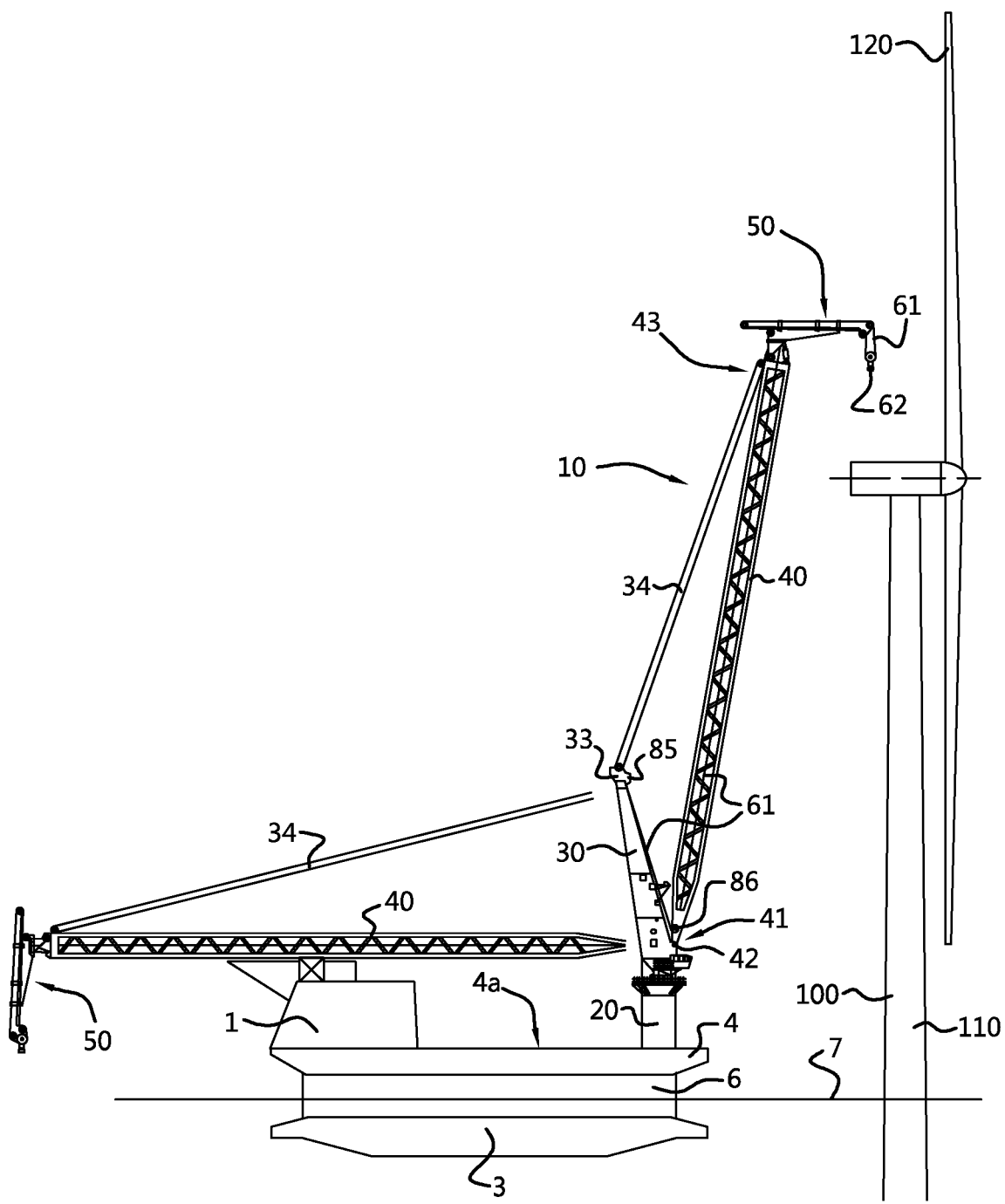
FIG. 1 schematically depicts a side view of a vessel including a crane positioned next to a wind turbine.
Figure 2:
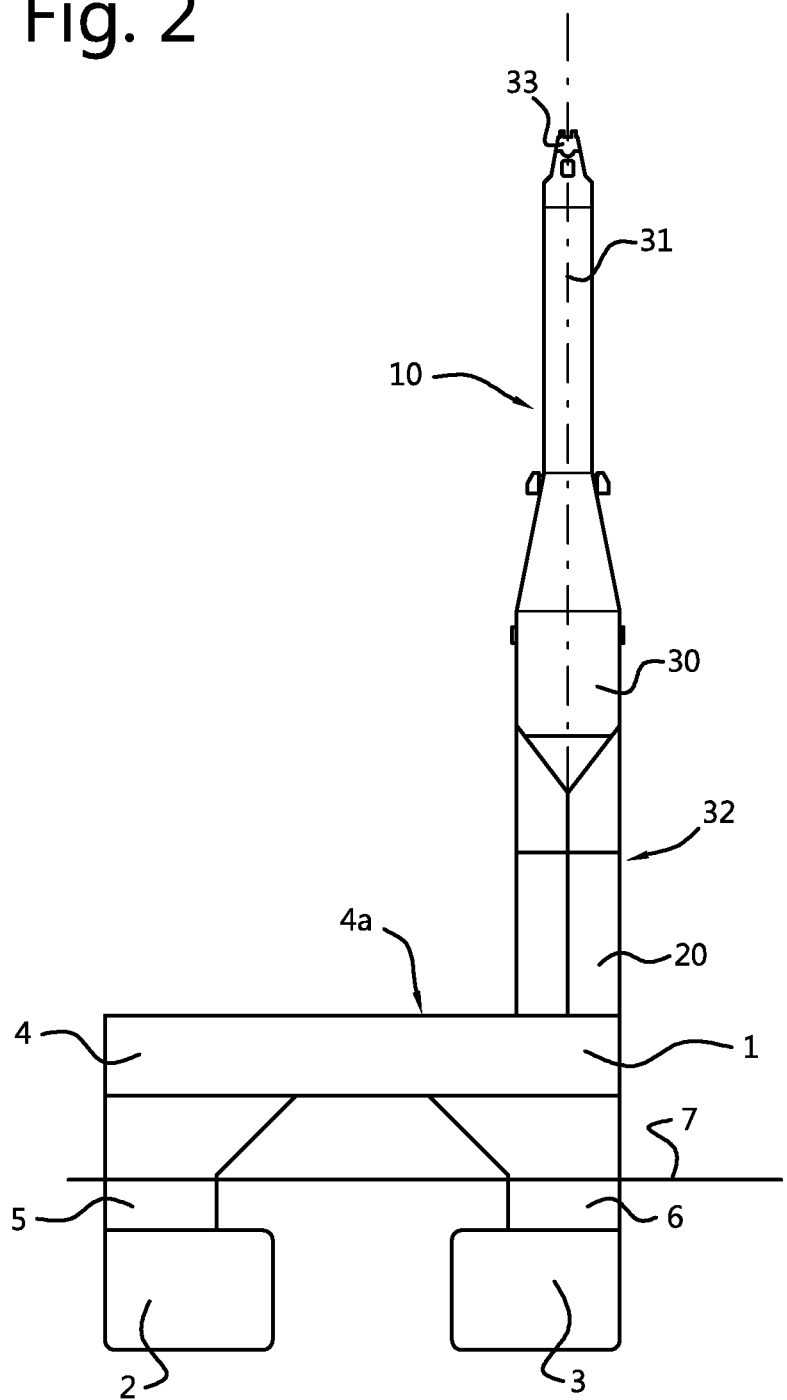
FIG. 2 schematically depicts a front view of the vessel and partially the crane of FIG. 1.
Figure 3:
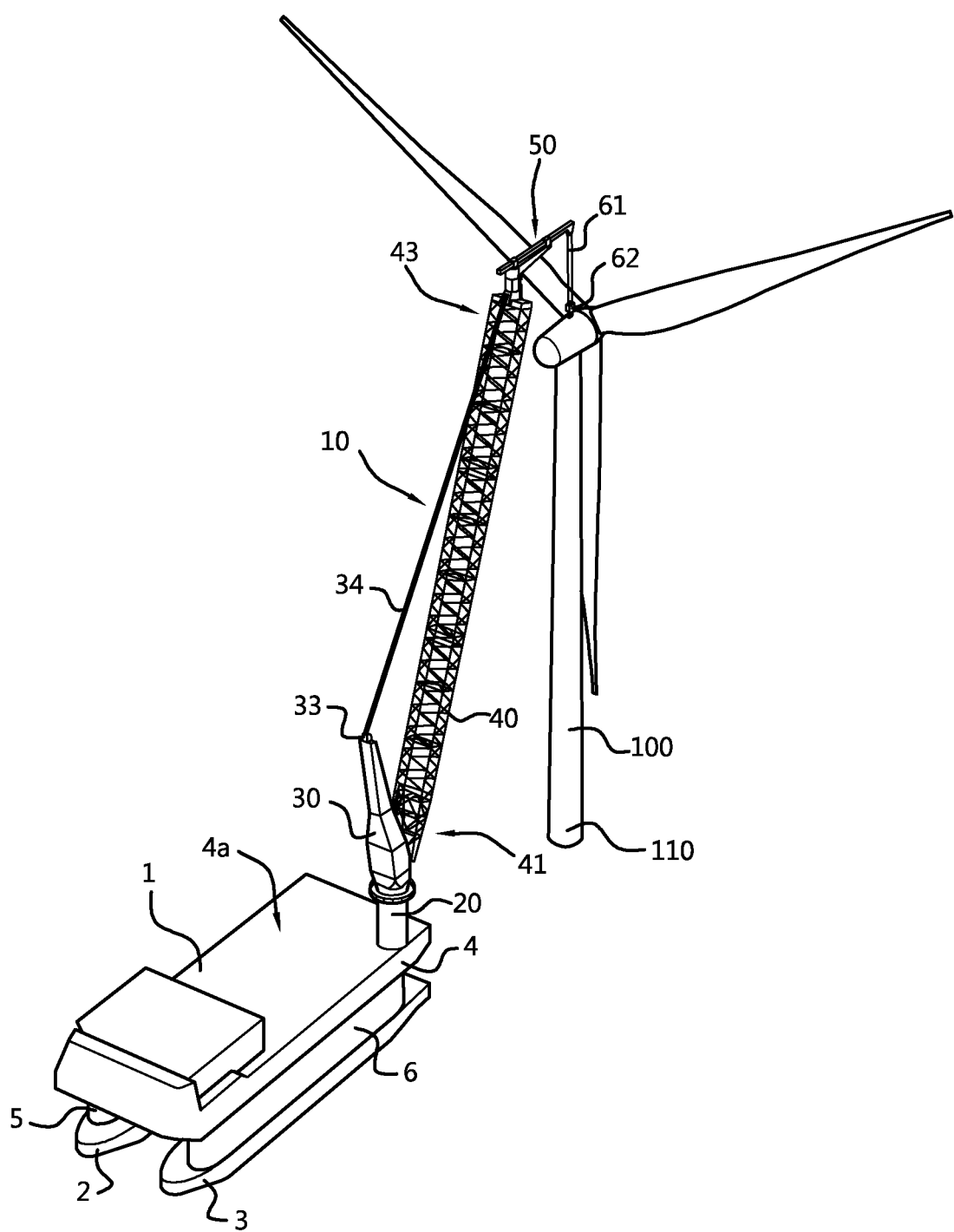
FIG. 3 schematically depicts a perspective view of the vessel, crane and wind turbine of FIG. 1.

In FIGS. 1-3 a vessel 1 is schematically depicted. The exemplary vessel 1 comprises two elongated pontoons 2, 3 and a platform or deck box 4 that is supported from the two pontoons 2,3 by two respective columns 5,6. Although a single column per pontoon is depicted in the figures, thereby resulting in a SWATH-type vessel, it will be apparent that other configurations, for instance in which two or three columns per pontoon are provided, thereby resulting in a more conventional semi-submersible vessel, are also feasible and envisaged.

As mentioned before, the advantage of a SWATH-type or semi-submersible vessel over a conventional monohull vessel is that the total cross sectional area of the columns intersecting the water surface 7 is smaller in a SWATH-type or semisubmersible vessel than the total cross sectional area of a conventional monohull vessel intersecting the water surface, so that the wave-induced motions of such a SWATH-type or semi-submersible vessel are smaller compared to a monohull vessel. However, wave-induced motions cannot be eliminated entirely in all situations.

The vessel 1 carries a crane 10 that is adapted to carry out offshore hoisting operations, in this case in relation to a wind turbine 100.

The crane 10 comprises a base structure 20, a revolving superstructure 30, a boom structure 40, a motion compensation device 50, a hoisting system, a heave compensation device, and a control unit.

The base structure 20 is adapted to be mounted or mounted on the vessel 1, in this case by being fixed to said vessel 1, so that said base structure 20 forms a unit with the vessel 1 that is subjected to wave-induced motion.

As can be best seen in FIGS. 2 and 3, the base structure 20 here is arranged in a corner of an upper deck 4a of the vessel leaving as much space free for other equipment or components, for instance to allow the vessel to transport wind turbine components such as wind turbine masts, wind turbine blades, nacelles, gear boxes and/or generators and thus to eliminate the use of another transport vessel.

The revolving superstructure 30 is adapted to revolve about a substantially vertical revolving axis 31 relative to the base structure 20. The revolving axis 31 can best be seen in FIG. 2. To allow the superstructure 30 to revolve about the revolving axis 31 relative to the base structure, a slew bearing 32 may be provided between the base structure 20 and the superstructure 30.

The boom structure 40 is pivotally mounted to the superstructure 30 with a first end 41 thereof to pivot about a substantially horizontal boom pivot axis 42 relative to the superstructure 30. In this embodiment, the boom structure is a single rigid and fixed length boom in the form of a latticed boom.

However, in an alternative embodiment, the boom structure may comprise a main boom section pivotally mounted to the superstructure 30 to pivot about the substantially horizontal boom pivot axis 42, and a jib section mounted pivotally about a substantially horizontal jib pivot axis to the main boom section.

Preferably, the main boom section comprises a boom member of which the lower end is pivotally mounted to the superstructure to pivot about the substantially horizontal boom pivot axis, a main boom strut of which an end is mounted to an upper end of the boom member and extending essentially perpendicular to the boom member, and a boom stay extending between the main boom strut and a lower portion of the boom member, wherein the jib section preferably comprises a jib member of which a lower end is pivotally mounted to the upper end of the boom member to pivot about the substantially horizontal jib pivot axis, a jib strut of which an end is mounted to the lower end of the jib member and extending essentially perpendicular to the jib member, and a jib stay extending between the jib strut and the jib member, and wherein a variable length stay mechanism is provided between the main boom strut and the jib strut to set an angle between the jib member and the boom member.

A luffing assembly is provided to set an angle of the boom structure 40 relative to the superstructure. The luffing assembly comprise a luffing winch 33 mounted to the superstructure and a luffing cable 34 extending between the superstructure 30 and a tip end portion 43 of the boom structure 40. In case the boom structure comprises a main boom section and a jib section, the luffing cable extends preferably between the superstructure 30 and an upper end of the main boom section.

In FIG. 1, the boom structure 40 including motion compensation device and luffing cable 34 is also depicted in a resting position in which the boom structure 40 is substantially horizontal and supported by the vessel at a distance from the boom pivot axis 42.

Due to wave-induced motion of the vessel 1, the tip end portion 43 of the boom structure 40 will move undesirably relative to the wind turbine 100. When the crane is for instance used to install or remove components at the top of the wind turbine mast 110, e.g. the nacelle, a wind turbine blade 120, a gearbox and/or generator, these undesired motions of the crane 10 will make this operation a challenge with such a vessel 1.

The motion compensation device 50 is provided to compensate for wave-induced motions of the vessel as much as possible in order to successfully carry out such an operation. The motion compensation device 50 is mounted to the tip end portion 43 of the boom structure 40 and for instance depicted in more detail in FIGS. 4 and 6-8. The motion compensation device 50 will be described below in more detail by reference to these drawings.

Figure 5:
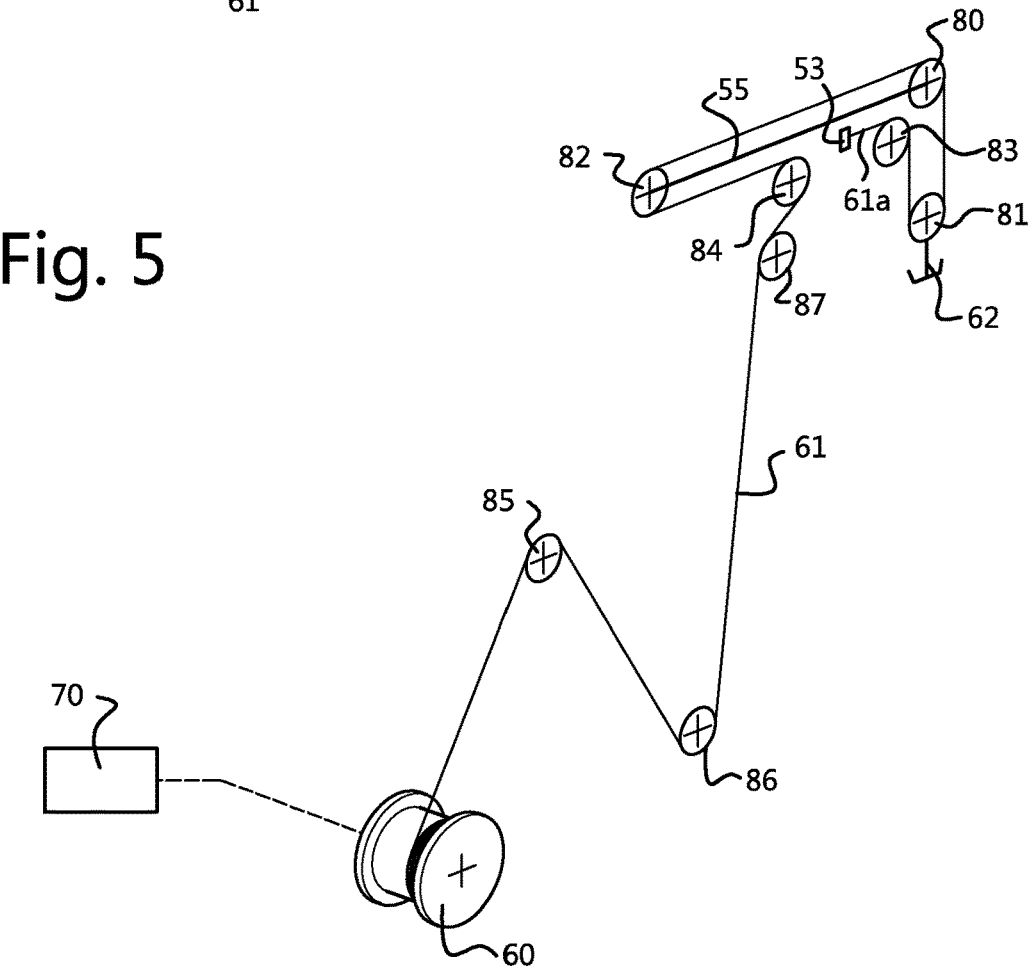
FIG. 5 schematically depicts the reeving of the hoist cable in the crane of FIG. 1.

As schematically depicted in FIG. 5, the hoisting system comprises a hoist winch 60, a hoist cable 61 and an object suspension device 62 suspended from said hoist cable 61. In this embodiment, the hoist winch 60 is mounted inside the superstructure 30, so that the hoist cable 61 extends from the hoist winch 60 along the boom structure 40 and the motion compensation device 50 to the object suspension device 62. FIG. 5 will be described in more detail later.

Referring now again to FIG. 4 and FIG. 6-8, the heave compensation device in this embodiment is an active heave compensation device integrated in the hoist winch 60 to act on the hoist cable 61 via the hoist winch 60. Alternatively, the heave compensation device may be arranged to act on the hoist cable 61 intermediate the hoist winch 60 and the tip end portion 43 of the boom structure 40. Also, the heave compensation device may be a passive heave compensation device instead of an active heave compensation device.

Figure 4:
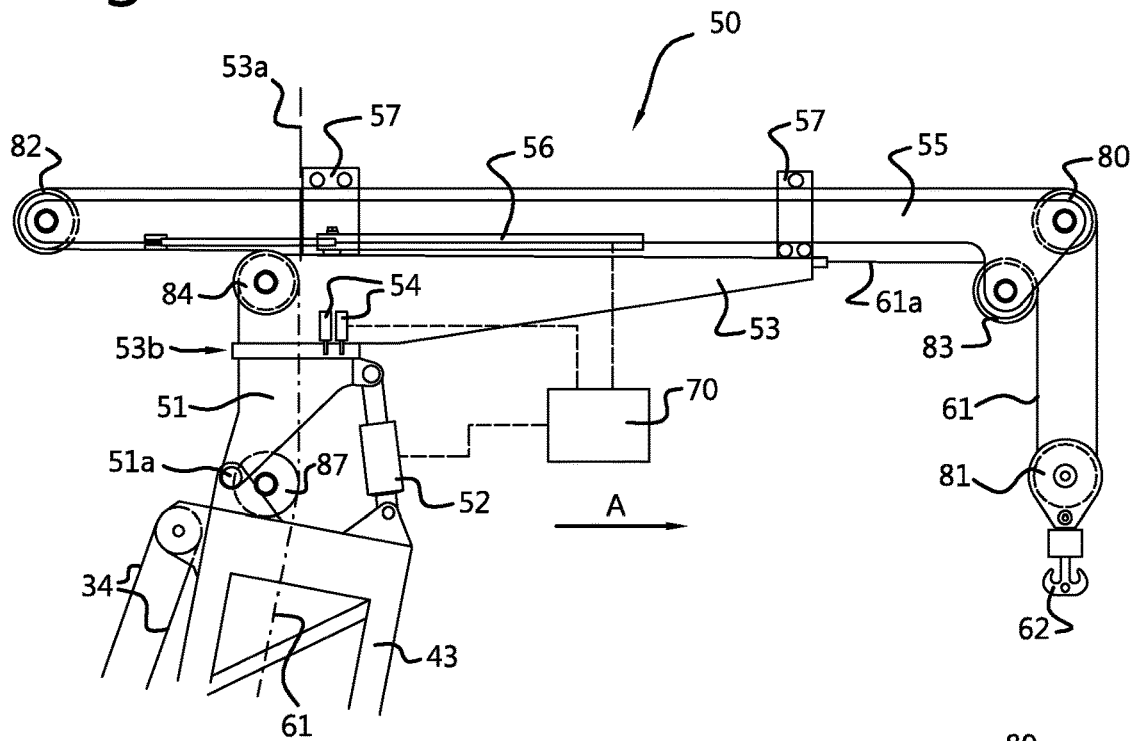
FIG. 4 schematically depicts a side view of a motion compensation device of the crane of FIG. 1.

The control unit 70 is connected to the heave compensation device as schematically depicted in FIG. 5 and to the motion compensation device 50 as schematically depicted in FIG. 4. A more elaborate description thereof can be found below.

The motion compensation device 50 comprises a pedestal member 51, a level setting device 52, a slewing jib beam support member 53, a slew drive 54, a linear displaceable jib beam 55 and a jib beam drive 56.

The pedestal member 51 is pivotally connected to the tip end portion 43 of the boom structure 40 to pivot about a substantially horizontal pedestal member pivot axis 51a which is parallel to the substantially horizontal boom pivot axis 42. In this embodiment, the pedestal member pivot axis 51a defines the sole degree of freedom of the pedestal member 51 relative to the tip end portion 43 of the boom structure 40.

The level setting device 52, in this embodiment formed by two hydraulic actuators 52, is arranged between the boom structure 40 and the pedestal member 51 and is adapted to set an angular orientation of the pedestal member 51 about the pedestal member pivot axis 51a thereby allowing to set the pedestal member in a levelled position in correspondence with an angular orientation of the boom structure portion that carried the motion compensation device.

The slewing jib beam support member 53 is secured to the pedestal member 51 to revolve about a vertical slew axis 53a relative to said pedestal member 51. In this embodiment, the jib beam support member 53 is a cantilever, wherein a rear portion thereof is connected with a slew bearing 53b to the pedestal member 51, and wherein the cantilever extends in a forward direction thereof indicated by arrow A.

The slew drive 54 is connected to the control unit 70 and adapted to cause controlled slew motion of the jib beam support member 53 about the slew axis 53a. In this embodiment, the slew drive comprises one or more slew drive motors 54 driving one or more pinions that mesh with a slew gear ring.

The linear displaceable jib beam 55 is supported by the jib beam support member 53 via one or more jib beam guides 57 that define a linear motion path of the jib beam 55 relative to the jib beam support member 53.

The jib beam drive 56 is connected to the control unit 70 and adapted to cause controlled linear motion of the jib beam 55 relative to the jib beam support member 53. In this embodiment, the jib beam drive 56 comprises a linear hydraulic cylinders 56 extending parallel to the jib beam 55.

The jib beam 55 carries a sheave arrangement with a front sheave 80, a rear sheave 82 and a first guide sheave 83. In addition to FIG. 4 and FIG. 6-8, FIG. 5 schematically depicts this sheave arrangement and the reeving of the hoist cable 61.

The front sheave 80 is arranged at a front portion of the jib beam 55 from which the hoist cable 61 extends to a sheave 81 of the object suspension device 62. The rear sheave 82 is arranged remote from the front sheave 80. The first guide sheave 83 is arranged such that said hoist cable 61 extends from the sheave 81 of the object suspension device 62 via the first guide sheave 83 to the jib beam support member 53 and is connected thereto with a terminal end 61a. The first guide sheave 83 is in this embodiment arranged such that the terminal end portion 61a of the hoist cable 61 extends parallel to the jib beam 55 and the associated linear motion path.

The jib beam support member 53 carries a second guide sheave 84 from which said hoist cable extends to the rear sheave 82 on the jib beam 55. In this embodiment, the second guide sheave 84 is arranged such that the hoist cable portion in between the second guide sheave 84 and the rear sheave extends parallel to the jib beam 55. Further, in this particular embodiment, the first and second guide sheaves 83, 84 are arranged in between the front and rear sheaves 80, 82 in all positions of the jib beam along the linear motion path.

The configuration of the sheaves on the jib beam support member and the sheaves on the jib beam combined with the fact that the terminal end of the hoist cable is connected to the jib beam support member is such that the length of hoist cable between the second guide sheave 84 on the jib beam support member 53 and the terminal end 61a is substantially constant independent of the linear position of the jib beam relative to the jib beam support member.

Preferably, as is the case in the shown embodiment, the hoist cable portion in between the sheave 87 and the second guide sheave 84 coincides with the slew axis 53a, so that slewing the jib beam support member about the slew axis 53a does not result in a Z-motion of the object suspension device.

The control unit 70 provides a wave-induced motion compensation mode wherein the slew drive 54 of the jib beam support member 54 and the jib beam drive 56 of the compensation device 50 are operated to maintain a predetermined X-Y location of the object suspension device. This X-Y location may be an absolute position relative to fixed ground, but may alternatively be a relative position relative to another vessel.

At least during the wave-induced motion compensation mode, but preferably also during other modes of the control unit, the heave compensation device is operable to compensate wave-induced Z-motion of the object suspension device.

As described before, the hoist winch 60 is located inside the superstructure 30. As may be verified from the schematic of the reeving of the hoist cable 61 in FIG. 5, one terminal end of the hoist cable is wound on a drum of the hoist winch 60. The hoist cable then extends from the hoist winch 60 to a sheave 85 at an upper end of the superstructure, which sheave 85 is also indicated and shown in FIG. 1. The hoist cable 61 further extends from the sheave 85 to a sheave 86 at a lower end of the boom structure 40. The hoist cable then extends through and along the boom structure 40 to a sheave 87 at an upper end of the boom structure, which sheave guides the hoist cable towards the second guide sheave 84.

Figure 6:
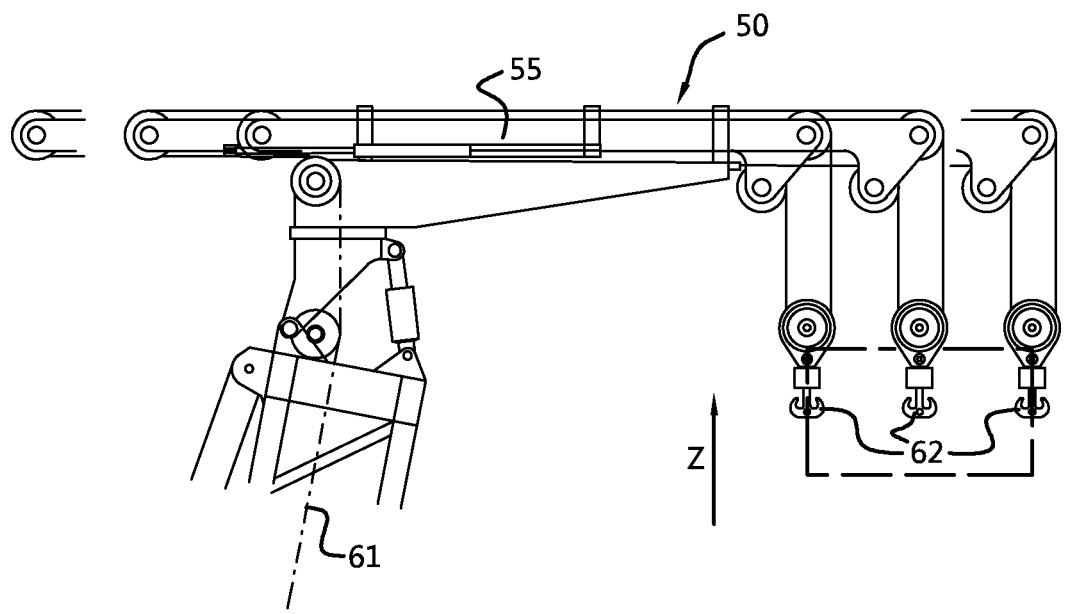
FIG. 6 schematically depicts in a side view several positions of the jib beam of the motion compensation device of FIG. 4.
Figure 7:
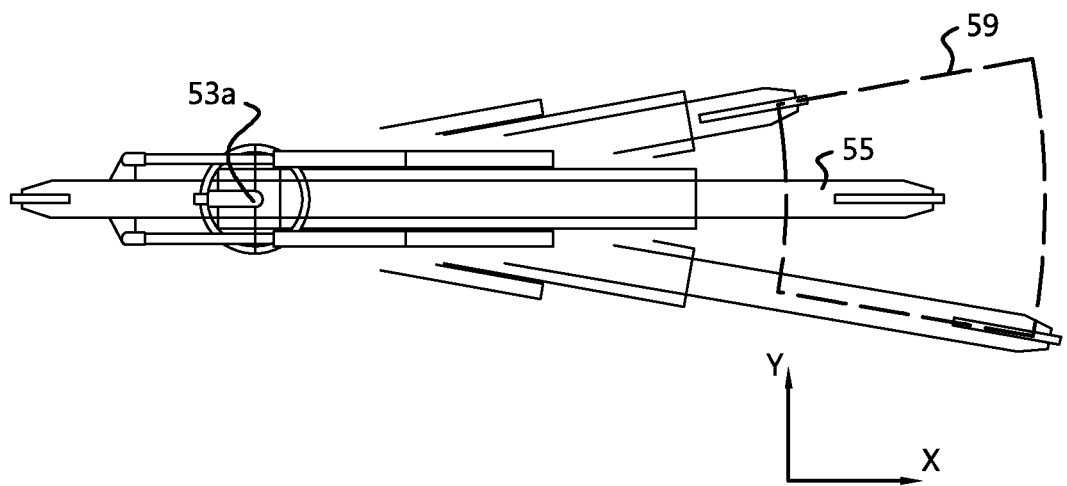
FIG. 7 schematically depicts in a top view several positions of the jib beam of the motion compensation device of FIG. 4.
Figure 8:
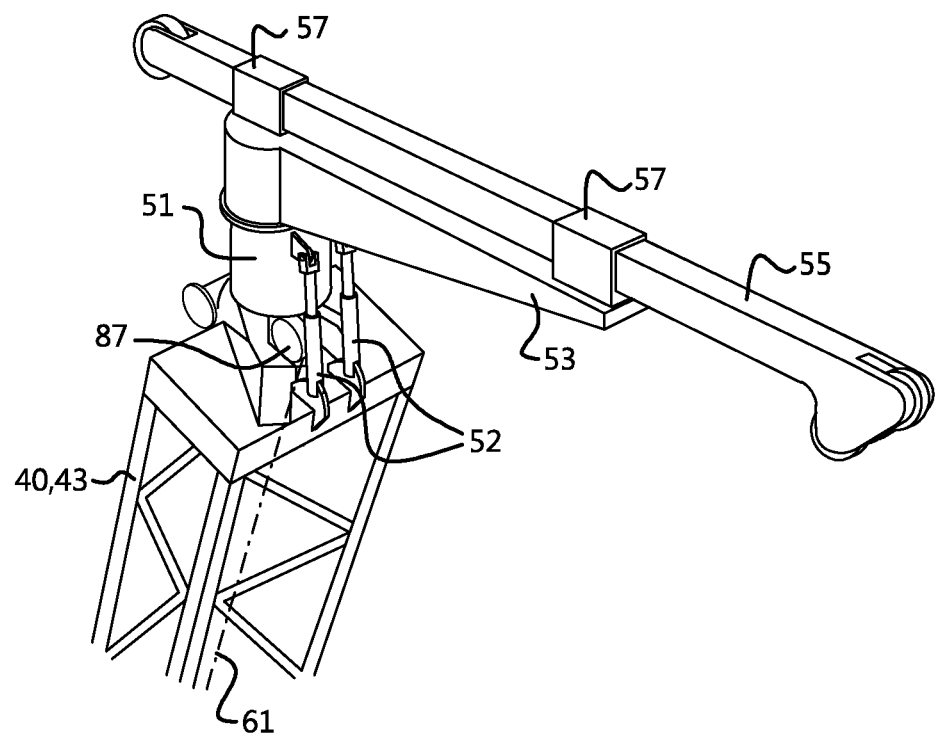
FIG. 8 schematically depicts a perspective view of the motion compensation device of FIG. 4.

FIGS. 6 and 7 respectively depict a side view and a top view of the motion compensation device with the jib beam in different positions along the linear motion path and in different angular positions about the slew axis 53*a*. In the horizontal plan as best shown in FIG. 7, this results in a horizontal motion compensation range in X-Y as depicted by the dashed element 59.

When the vessel is used to transfer a load, e.g. for installing a wind turbine component or for carrying out maintenance to said wind turbine component, the crane may first be positioned relative to a first vessel or structure. When positioning relative to a first vessel, the first vessel may be the vessel carrying the crane, but may also be another vessel. When positioning relative to a first structure, the first structure may be a wind turbine or part thereof, a foundation for a wind turbine, but e.g. also a fixed platform.

A load may be hoisted from the first vessel or structure with the object suspension device after which the load can be positioned above a second vessel or structure, e.g. in or on a nacelle of an offshore wind turbine. Again the second vessel may be the vessel carrying the crane, but can also be another vessel. The second structure may be a wind turbine or part thereof, a foundation for a wind turbine or a fixed platform. The load can then be lowered onto the second vessel or structure.

When a relative wave-induced motion is present between the vessel carrying the crane and the first vessel or structure and/or between the vessel carrying the crane and the second vessel or structure, the control unit is operated in wave-induced motion compensation mode and the heave compensation device is operated to compensate wave-induced motion of the object-suspension device at least when the load is in contact with or close to the corresponding first or second vessel or structure.

Although the above embodiment describes a sheave arrangement with single sheaves, it is also possible in embodiments to have multiple sheaves with a coinciding sheave rotation axis at one or more sheave locations depending on the load to be carried. Hence, for instance, a multi-fall arrangement including multiple sheaves may be provided between the jib beam and the object suspension device.

Although the shown vessel is a non-jack-up type vessel, it is also envisaged in embodiments that the vessel comprises jack-up legs allowing to position the vessel on a seabed and to lift the vessel at least partially out of the water so that the crane can also be used in conditions in which the motion compensation device is not able to fully compensate for wave-induced motion of the vessel in case the jack-up legs are not extended.

Although in the shown examples, the jib beam is moveable in two directions, namely by being able to slew about the slew axis and by translating along the linear motion path, it is envisaged in embodiments that the jib beam is only moveable along the linear motion path and the slewing possibility is not provided or should be provided by revolving the superstructure instead. In that case a crane and vessel are provided according to the second aspect of the invention. Further, although it is only shown that the jib beam is translatable, the same function can be obtained using a telescopic jib beam or by providing moveable sheaves or sheave blocks. In that case a crane and vessel are provided according to the third aspect of the invention.

The invention claimed is:

1. A wave-induced motion compensating crane for use on an offshore vessel, the crane comprising:
    a base structure adapted to be mounted on an offshore vessel;
    a revolving superstructure adapted to revolve about a substantially vertical revolving axis relative to the base structure;
    a boom structure mounted to the superstructure and pivotally connected at a first end thereof to pivot about a substantially horizontal boom pivot axis relative to the superstructure;
    a motion compensation device mounted to a tip end portion of the boom structure;
    a hoist winch, a hoist cable, and an object suspension device suspended from said hoist cable, wherein the hoist winch is mounted on the revolving superstructure or on the boom structure, and wherein the hoist cable extends from the hoist winch to the tip end portion of the boom structure and then along the motion compensation device to the object suspension device;
    a heave compensation device that is configured to act on the hoist cable, wherein the heave compensation device is integrated in the hoist winch and/or arranged to act on the hoist cable intermediate the hoist winch and the tip end portion of the boom structure; and
    a control unit,
    wherein the motion compensation device comprises:
        a pedestal member that is pivotally connected to the tip end portion of the boom structure to pivot about a substantially horizontal pedestal member pivot axis which is parallel to the substantially horizontal boom pivot axis;
        a level setting device that is arranged between the boom structure and the pedestal member and that is adapted to set the pedestal member in a levelled position;
        a slewing jib beam support member that is secured to the pedestal member to revolve about a vertical slew axis relative to said pedestal member in said levelled position thereof;
        a slew drive connected to said control unit and adapted to cause controlled slew motion of said jib beam support member about said vertical slew axis;
        a linear displaceable jib beam that is supported by said jib beam support member via one or more jib beam guides that define a linear motion path of the jib beam relative to the jib beam support member, said linear motion path extending substantially horizontal when said pedestal member is in said levelled position; and
        a jib beam drive connected to said control unit and adapted to cause controlled linear motion of said jib beam relative to the jib beam support member,
    wherein the jib beam carries a sheave arrangement with a front sheave at a front portion of the jib beam from which the hoist cable extends to a sheave of the object suspension device, with a rear sheave remote from said front sheave, and with a first guide sheave arranged such that said hoist cable extends from a sheave of the object suspension device via the first guide sheave to the jib beam support member and is connected thereto with a terminal end,
    wherein the jib beam support member carries a second guide sheave from which said hoist cable extends to the rear sheave on the jib beam,
    wherein the first and second guide sheaves are arranged so that the length of hoist cable between the second guide sheave on the jib beam support member and the terminal end is substantially constant independent of the linear position of the jib beam relative to the jib beam support member, wherein the control unit is configured to provide a wave-induced motion compensation mode wherein the slew drive of the jib beam support member and the jib beam drive of the compensation device are operated to maintain a predetermined X-Y location of the object suspension device, and wherein the heave compensation device is configured to compensate wave-induced Z-motion of the object suspension device.

2. The crane according to claim 1, wherein the level setting device is connected to the control unit, and wherein the control unit is configured to operate the level setting device at least prior to operating in the wave-induced motion compensation mode to set the pedestal member level in correspondence with the angle of the boom structure portion that carries the motion compensation device.

3. The crane according to claim 2, wherein the control unit is further configured to keep the pedestal member stationary relative to the boom portion during the wave-induced motion compensation mode.

4. The crane according to claim 1, wherein the pedestal member pivot axis defines the sole degree of the freedom of the pedestal member relative to the tip end portion of the boom structure.

5. The crane according to claim 1, wherein the heave compensation device is an active heave compensation device connected to the control unit.

6. The crane according to claim 1, wherein the jib beam support member is a cantilever, wherein a rear portion thereof is connected with a slew bearing to the pedestal member, and wherein the cantilever extends in forward direction thereof.

7. The crane according to claim 1, wherein the slew drive comprises one or more slew drive motors driving one or more pinions that mesh with a slew gear ring.

8. The crane according to claim 1, wherein the jib beam drive comprises one or more linear hydraulic cylinders extending parallel to the jib beam.

9. The crane according to claim 1, wherein the boom structure is a single rigid and fixed length boom.

10. An offshore vessel comprising the crane according to claim 1.

11. The offshore vessel according to claim 10, wherein the base structure is fixed to said vessel so that said base structure forms a unit with said vessel that is subjected to wave-induced motion.

12. The offshore vessel according to claim 10, wherein the vessel is a semi-submersible vessel.

13. The offshore vessel according to claim 10, wherein the vessel is a jack-up vessel having jack-up legs, and wherein the crane is an around-the-leg crane with the superstructure revolving around a jack-up leg.

14. A wave-induced motion compensating crane for use on an offshore vessel, the crane comprising:
a base structure adapted to be mounted on an offshore vessel;
a revolving superstructure adapted to revolve about a substantially vertical revolving axis relative to the base structure;
a boom structure mounted to the superstructure and pivotally connected at a first end thereof to pivot about a substantially horizontal boom pivot axis relative to the superstructure;
a motion compensation device mounted to a tip end portion of the boom structure;
a hoist winch, a hoist cable, and an object suspension device suspended from said hoist cable, wherein the hoist winch is mounted on the revolving superstructure or on the boom structure, and wherein the hoist cable extends from the hoist winch to the tip end portion of the boom structure and then along the motion compensation device to the object suspension device; and
a control unit,
wherein the motion compensation device comprises:
a pedestal member that is pivotally connected to the tip end portion of the boom structure to pivot about a substantially horizontal pedestal member pivot axis which is parallel to the substantially horizontal boom pivot axis;
a level setting device that is arranged between the boom structure and the pedestal member and that is adapted to set the pedestal member in a levelled position;
a slewing jib beam support member that is secured to the pedestal member to revolve about a vertical slew axis relative to said pedestal member in said levelled position thereof;
a slew drive connected to said control unit and adapted to cause controlled slew motion of said jib beam support member about said vertical slew axis;
a linear displaceable jib beam that is supported by said jib beam support member via one or more jib beam guides that define a linear motion path of the jib beam relative to the jib beam support member, said linear motion path extending substantially horizontal when said pedestal member is in said levelled position; and
a jib beam drive connected to said control unit and adapted to cause controlled linear motion of said jib beam relative to the jib beam support member,
wherein the jib beam carries a sheave arrangement with a front sheave at a front portion of the jib beam from which the hoist cable extends to a sheave of the object suspension device, with a rear sheave remote from said front sheave, and with a first guide sheave arranged such that said hoist cable extends from a sheave of the object suspension device via the first guide sheave to the jib beam support member and is connected thereto with a terminal end,
wherein the jib beam support member carries a second guide sheave from which said hoist cable extends to the rear sheave on the jib beam,
wherein the first and second guide sheaves are arranged so that the length of hoist cable between the second guide sheave on the jib beam support member and the terminal end is substantially constant independent of the linear position of the jib beam relative to the jib beam support member, and
wherein the control unit is configured to provide a wave-induced motion compensation mode wherein the slew drive of the jib beam support member and the jib beam drive of the compensation device are operated to maintain a predetermined X-Y location of the object suspension device.

15. The crane according to claim 14, wherein the level setting device is connected to the control unit, and wherein the control unit is configured to operate the level setting device at least prior to operating in the wave-induced motion compensation mode to set the pedestal member level in correspondence with the angle of the boom structure portion that carries the motion compensation device.

16. The crane according to claim 14, wherein the pedestal member pivot axis defines the sole degree of the freedom of the pedestal member relative to the tip end portion of the boom structure.

17. The crane according to claim 14, wherein the jib beam support member is a cantilever, wherein a rear portion thereof is connected with a slew bearing to the pedestal member, and wherein the cantilever extends in forward direction thereof.

18. A wave-induced motion compensating crane for use on an offshore vessel, the crane comprising:
- a base structure adapted to be mounted on an offshore vessel;
- a revolving superstructure adapted to revolve about a substantially vertical revolving axis relative to the base structure;
- a boom structure mounted to the superstructure and pivotally connected at a first end thereof to pivot about a substantially horizontal boom pivot axis relative to the superstructure;
- a motion compensation device mounted to a tip end portion of the boom structure;
- a hoist winch, a hoist cable and an object suspension device suspended from said hoist cable, wherein the hoist winch is mounted on the revolving superstructure or on the boom structure, and wherein the hoist cable extends from the hoist winch to the tip end portion of the boom structure and then along the motion compensation device to the object suspension device;
- a heave compensation device that is configured to act on the hoist cable, wherein the heave compensation device is integrated in the hoist winch and/or arranged to act on the hoist cable intermediate the hoist winch and the tip end portion of the boom structure; and
- a control unit, wherein the motion compensation device comprises:
- a pedestal member that is pivotally connected to the tip end portion of the boom structure to pivot about a substantially horizontal pedestal member pivot axis which is parallel to the substantially horizontal boom pivot axis;
- a level setting device that is arranged between the boom structure and the pedestal member and that is adapted to set the pedestal member in a levelled position;
- a jib beam support member that is secured to the pedestal member;
- a linear displaceable jib beam that is supported by said jib beam support member via one or more jib beam guides that define a linear motion path of the jib beam relative to the jib beam support member, said linear motion path extending substantially horizontal when said pedestal member is in said levelled position; and
- a jib beam drive connected to said control unit and adapted to cause controlled linear motion of said jib beam relative to the jib beam support member, wherein the jib beam carries a sheave arrangement with a front sheave at a front portion of the jib beam from which the hoist cable extends to a sheave of the object suspension device, with a rear sheave remote from said front sheave, and with a first guide sheave arranged such that said hoist cable extends from a sheave of the object suspension device via the first guide sheave to the jib beam support member and is connected thereto with a terminal end, wherein the jib beam support member carries a second guide sheave from which said hoist cable extends to the rear sheave on the jib beam, wherein the first and second guide sheaves are arranged so that a length of hoist cable between the second guide sheave on the jib beam support member and the terminal end is substantially constant independent of the linear position of the jib beam relative to the jib beam support member, wherein the control unit is configured to provide a wave-induced motion compensation mode wherein the jib beam drive of the compensation device is operated to maintain a predetermined location of the object suspension device in a direction parallel to the linear motion path, and wherein the heave compensation device is configured to compensate wave-induced Z-motion of the object suspension device.

19. The crane according to claim 18, wherein the level setting device is connected to the control unit, and wherein the control unit is configured to operate the level setting device at least prior to operating in the wave-induced motion compensation mode to set the pedestal member level in correspondence with the angle of the boom structure portion that carries the motion compensation device.

20. An offshore vessel comprising the crane according to claim 18.

* * * * *